United States Patent [19]

Henriksson

[11] Patent Number: 4,700,366

[45] Date of Patent: Oct. 13, 1987

[54] METHOD FOR THE RECEPTION AND DETECTION OF DIGITAL SIGNALS

[75] Inventor: Jukka Henriksson, Espoo, Finland

[73] Assignee: Oy Nokia AB, Helsinki, Finland

[21] Appl. No.: 794,371

[22] Filed: Nov. 4, 1985

[30] Foreign Application Priority Data

Dec. 5, 1984 [FI] Finland ............................ 844809

[51] Int. Cl.⁴ .............................................. H04B 7/08
[52] U.S. Cl. ..................................... 375/100; 455/139
[58] Field of Search .................. 375/40, 100; 455/137, 455/138, 139; 328/154

[56] References Cited

U.S. PATENT DOCUMENTS

| | | | |
|---|---|---|---|
| 3,911,364 | 10/1975 | Langseth et al. | 455/139 |
| 4,354,276 | 10/1982 | Karabinis | 455/139 |
| 4,528,697 | 7/1985 | Nichols | 455/139 |

Primary Examiner—Benedict V. Safourek
Attorney, Agent, or Firm—Birch, Stewart, Kolasch & Birch

[57] ABSTRACT

A method for the reception and the detection of digital signals wherein at least two signals ($s_1, s_2, \ldots s_M$) having at least approximately the same information content are received and at least all signals ($s_1, s_2, \ldots, s_M$) but one are subjected to a phase shift. The shifted signals ($s'_1, s'_2, \ldots, s'_M$) are combined in a summing point, the sum signal (s) is fed to a detector for detection, a reference carrier (ca) is generated in a reference carrier generator and a coherent demodulation and detection is carried out in the detector by means of said carrier (ca). According to the invention a projection voltage ($z_k$) defined by the equation $z_k = y_{Qk} s_{Ik} - y_{Ik} s_{Qk}$ is generated, wherein $y_{Ik}$ is a signal sample in the in-phase branch before threshold decision in the detector, $y_{Qk}$ is the signal sample in the quadrature branch before decision, $s_{Ik}$ is the detected signal in the in-phase branch, and $s_{Qk}$ is the detected signal in the quadrature branch.

16 Claims, 9 Drawing Figures

METHOD FOR THE RECEPTION AND DETECTION OF DIGITAL SIGNALS

The present invention concerns a method for the reception and detection of digital signals and is intended for application especially in context of radio-relay systems employing diversity reception. The method involves summation of one or more received (phase modulated or phase and amplitude modulated) pulse trains, for which summation operation weighting coefficients are generated by previously received and demodulated signals.

In this connection reference is made to the following literature:

/1/ Microwave mobile communications. W. C. Jakes (ed.) John Wiley & Sons, New York 1974, 642 p.

/2/ Feher K., Chan D.: PSK combine for fading microwave channels. IEEE Transactions on communications, May 1975, ss. 554 ... 7.

/3/ Lindsey W. C., Simon M. K.: Telecommunication systems engineering. Prentice-Hall, Inc., Englewood Cliffs 1973, 574 p.

/4/ U.S. Pat. No. 4,271,525, Watanabe K. June 2, 1981, Nippon Electric Co., Japan.

/5/ Lucky R. W., Salz J., Weldon E. J.: Principles of data communication McGrow-Hill 1968, 4335

/6/ Komaki S., Yoshiharu O. Kojiro T.: Performance of 16-QAM digital radio systems using new space diversity ICC-80, pp. 52.2.1 ... 6.

/7/ Van Trees H. L.: Detection, estimation and modulation theory, pt. III. John Wiley & Sons, New York 1971, 626 p.

The purpose of the method of diversity reception is to secure the best signal possible under conditions of multipath fading. The use of diversity reception for such a purpose is exemplified by Ref. /1/, pages 423 to 489 (for analog signals) and Ref. /2/ (for digital, phase-modulated signals).

The method described is also applicable to equalizers using transversal filtering in which the previously known criteria of optimization (minimum square error, zero forcing method, Ref. /5/, pages 147-156) are replaced by the previously unused criterion or minimum projection.

Figure 1:
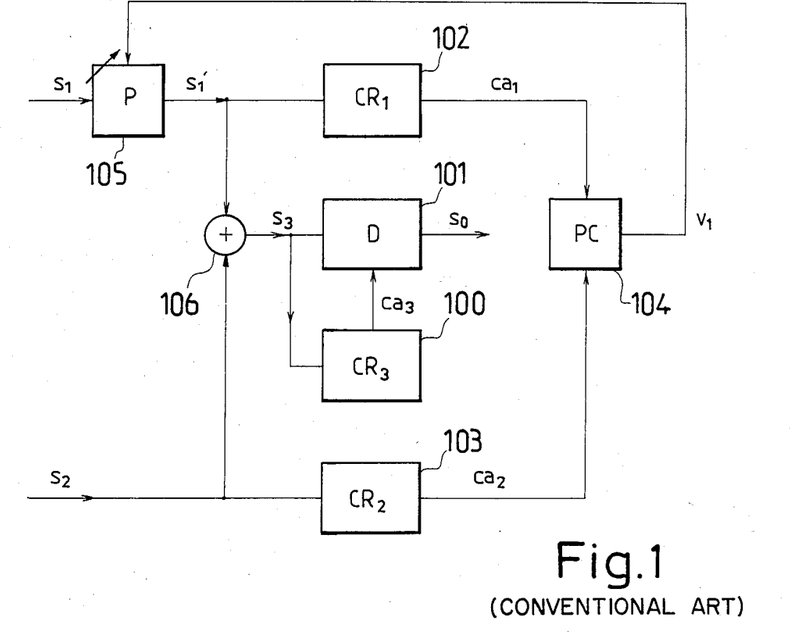
FIG. 1 is a block diagram showing a conventional system for combining and demodulating analog and digital signals.

Currently known systems for combining and demodulating analog and digital signals follow a principle illustrated by FIG. 1, in accordance with References /1/ and /2/.

Signals $s_1$ and $s_2$ coming to the receiver are APSK modulated. Signal $s_1$ is brought to phase shifter 105 producing phase change $\theta$ in the signal now denoted $s'_1$. Signals $s'_1$ and $s_2$ are taken to summing network 106, which produces signal $s_3$, equal to $s'_1+s_2$. The carrier is extracted from signal $s_3$ by carrier regenerator 100 (using e.g., nonlinearity+filtering method or Costas loop, Ref. /3/). The carrier $ca_3$ is employed for coherent demodulation in demodulator 101. In order to obtain in-phase signals, to be combined in the summing network 106, carriers corresponding to signals $s'_1$ and $s_2$ are generated by means of carrier regenerators 102 and 103. The carriers $ca_1$ and $ca_2$ obtained are taken to phase comparator 104 whose output $v_1$ is zero when $ca_1$ and $ca_2$ are in phase.

Thus adjustments in the phase shifter 105 are concluded when the carriers of signals $s'_1$ and $s_2$ are in phase and the sum signal $s_3$ is maximized.

A number of practical solutions are known for the operation described, all characterized by phase recovery of signals $s'_1$ and $s_2$ on the basis of sine-wave signals carrier frequency.

In addition to the above, methods of diversity reception specifically for digital signals have been proposed. These techniques make use of already demodulated signals. Familiar applications of this principle include those of Ref. /4/ characterized by attempts to minimize the mean square error at the decision making point by means of special diversity arrangements. In Ref. /4/, this is effected by using matched adaptive equalizers in each diversity branch.

In addition, schemes are known in which the phase adjustments of diversity combining operations follow the combined signal spectrum to provide a spectrum of maximum flatness, Ref. /6/. The aim is one of minimum dispersion combination. Demodulated symbols of a digital signals are thus not used.

The commonly used schemes employing diversity combining based on carriers kept in phase, do not produce optimal results under conditions of a highly dispersive transmission path (multipath propagation, selective fading).

The said techniques do not take into account the interaction between signals in phase and quadrature branches leading to an increased probability of errors in digital transmission.

Methods based on minimizing the mean square error appearing at the decision making point give results better than those mentioned above, but even they do not make optimum use of the nature of the digital modulation applied. The mean square error as a criterion for optimization is not fully compatible with the form of the decision area. This is significant especially during deep selective fades.

Methods using minimum dispersion combining and solely based on following the signal spectrum do not necessarily produce low error probability in all instances. Such a system is often technically complex to realize.

The purpose of the present invention is to avoid the drawbacks related to the above prior art and to provide an entirely new method for the reception and detection of digital signals.

The method according to the invention is based on the following ideas:

The method makes use of a demodulator employing diversity reception of APSK signals The method minimizes the mean square deviation, or minimum projection, which is a new criterion for optimization (cf. the familiar mean square error)

The demodulator makes use of a decision directed loop to generate the reference carrier. This is almost indispensable for the generation of projection control increments.

Summation of diversity branch signals is effected by phase shifters or combination phase and amplitude shifters (weighting elements) in all branches, or in all but one branch.

Control of weighting elements is based on decisions made during demodulation.

Control of weighting elements is obtained by multiplying with each other (a) instantaneous control increments (projections) of the decision controlled loop and (b₁) the product of the combiner sum and the branch signal preceding the weighting element (low-pass filtered), or (b₂) the product of the combiner sum and the branch signal (b₃) (in the case of two branches) the product of both branch signals appearing at the summing point (low-pass filtered) or, by making technical modifications to obtain the mathematically equivalent functions.

The method is a mixture of minimum dispersive and maximal ratio combining techniques. When dispersion is negligible, the branches are weighted on the principle of maximum ratio whereas in conditions of high dispersion the branch signals are combined so as to minimize the effect of dispersion components.

The most significant feature of the method described is the utilization of projection quantity $z_k$ for the control of the weighting elements. The projection $z_k$ is obtained from the formula $$z_k = y_{Qk} s_{Ik} - y_{Ik} s_{Qk}$$

where $y_{Ik}$ is the signal sample at the phase branch before demodulation $y_{Qk}$ is the signal sample at the quadrature branch $s_{Ik}$ is the demodulated signal at the phase branch $s_{Qk}$ is the demodulated signal at the quadrature branch The method is also applicable to equalizers making use of transversal filters. The tap weights are then controlled based on the minimum projection principle.

In more accurate terms, the method according to the invention is characterized by what is stated in claim 1.

Under normal conditions of no fading, the proposed solution of diversity combination produces results similar to those obtained by using the earlier solutions. The advantages of the invention are apparent on a highly dispersive, selectively faded channel, when the receiver receives, in addition to the main signal, delayed signals of changed amplitude and phase. The receiver then combines the diversity branches (or adjusts the the equalizer coefficients) so as to minimize the combined disturbance of noise and interference in the minimum projection sense. Especially during periods of deep fading, the elimination of dispersion components by means of the system described improves the performance of the receiver in relation to that obtainable by using conventional methods.

The method accordings to the invention is technically less complicated than some other methods, such as that referred to in Ref. /6/, in which other forms of control are used to obtain a result characterized by minimum dispersion.

The criterion for control, minimum projection, is of nature very close to error probability, a performance measure commonly used in digital transmission. The principle of optimization according to the invention therefore leads to a favourable result in terms of error probability.

The invention relaxes the requirement to compensate for differences of delay in the diversity branches because the resulting phase differences are automatically taken into account in the phase shifters.

The invention relaxes the requirements for receiver timing because the diversity braches are optimally combined for each timing phase, resulting in an extended range of usable timing variation.

The invention will now be described in more detail, reference being made to the FIGS. 2 to 9.

Figure 2:
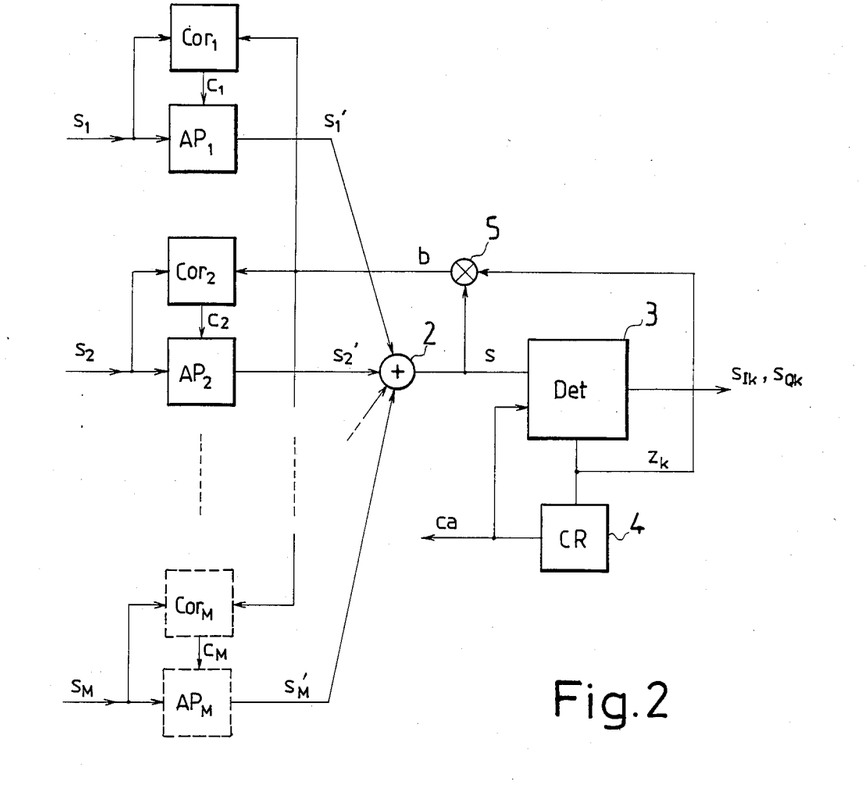
FIG. 2 is a block diagram showing the general principle of the invention.

Consider a diversity receiver which uses digital quadrature modulation and which has a block diagram as given in FIG. 2. M signals $s_1 \ldots s_M$ are simultaneously received, e.g., from separate antennae or from taps in a transversal equalizer delay line. To each of these signals (or to each but one, which will be discussed later) an amplitude and phase shift, or only phase shift, is caused by devices $AP_1, \ldots AP_{M-1}(AP_M)$. The shifted (processed) signals $s_1, \ldots s_M$ are fed to a combiner (summing point) 2 and the combined result is fed to a conventional quadrature modulation detector 3, which can be, e.g., of the form given in FIG. 3. The reference carrier ca, output of the carrier regenerator 4, can be generated by any proper means (e.g., Costas loop) but the best result is obtained by the use of a decision directed loop (DDL) /3/. The demodulator in FIG. 3 consists of multipliers 6 and 7 (e.g., balanced mixers), low-pass type receiving filters 8 and 9, sample and hold circuits 10 and 11 and decision circuits 12 and 13. The upper branch processes the in-phase signals and the output is the in-phase detector symbol $s_{Ik}$ while the lower branch processes the quadrature signal with its output being the quadrature detected symbol $s_{Qk}$. The analog samples of the in-phase and quadrature signals $y_{Ik}$ and $y_{Qk}$ before the decision circuits 12 and 13 are essential to fulfill the key operation of the invention.

Figure 3:
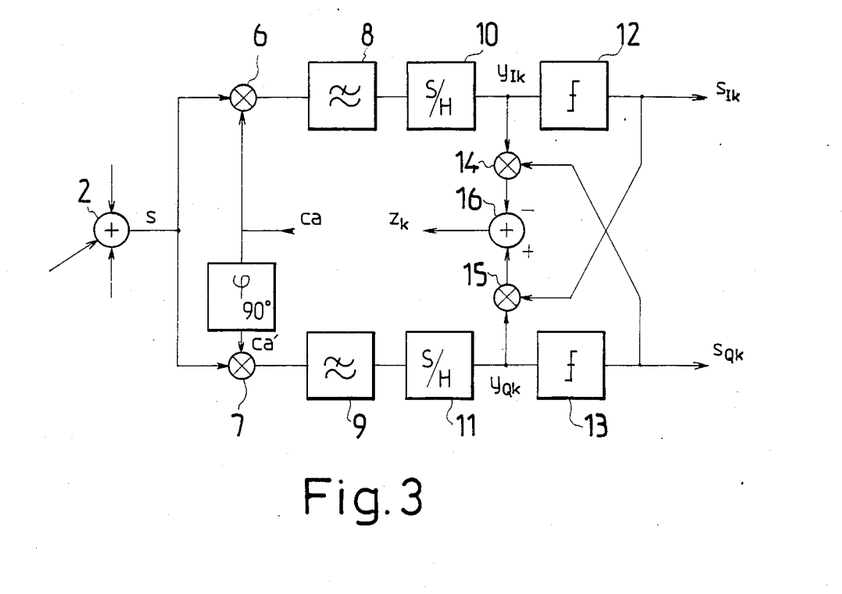
FIG. 3 is a block diagram of a system for determining the projection.
Figure 4:
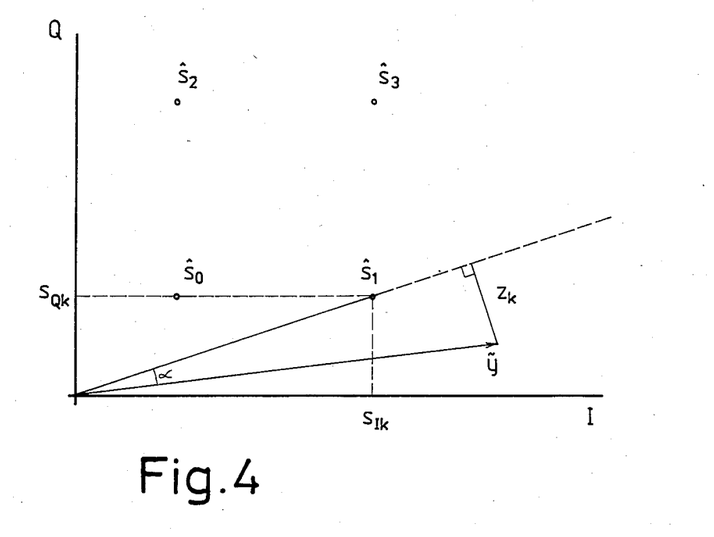
FIG. 4 is a diagram showing how the projection is determined by means of the system of FIG. 3.

The essential feature of the invention is to calculate a projection quantity $z_k$ in the receiver. This is schematically illustrated in FIG. 4 where the first quadrant of the signal diagram of 16 QAM modulation is given. The received signal sample $\tilde{y}$ is given in the complex form $$\tilde{y} = y_{Ik} + j y_{Qk} \tag{1}$$

and the possible detected symbols are denoted $s_i$ (i=0,1,2,3). The projection variable is now calculated $$z_k = Im\{\tilde{y} \tilde{s}_k^*\} \tag{2}$$

$$= y_{Qk} s_{Ik} - y_{Ik} s_{Qk} \tag{3}$$

which actually is a variable proportional to the said projection. The mechanization of the calculation of this projection is given in FIG. 3.

The detected symbol $s_{Ik}$ is a positive or negative voltage, which has a constant value during each symbol interval of length T. The symbol voltage $s_{Ik}$ can only have a few discrete values (see FIG. 4) e.g. in 16 QAM it will have four possible values. Similarly the signal sample $y_{Qk}$ may be a positive or negative (or zero) voltage but it is an analog voltage and hence all values are possible. Also the voltage $y_{Qk}$ is kept constant during the symbol interval T. These two voltages are fed to a DC-type multiplier 14. This multiplier can be realized e.g. digitally by using analog-to-digital converters for voltages $y_{Qk}$ and $s_{Ik}$ and a digital multiplier. Equivalent operations are applied to obtain the product $y_{Ik}s_{Qk}$. The products are fed to a summing circuit 16, which for analog voltages can be of a resistor matrix and operational amplifier type or in digital realization a digital difference circuit. The output voltage $z_k$ may be an analog signal or digital signal depending on the realization principle of the rest of the receiver.

We also note that, independently of the implementation techniques of the receiver, the signal $z_k$ can be quantized to consist of only a few discrete values, e.g., $+1$ and $-1$. The quantities $z_k$ can be used in the decision directed loop for carrier regeneration according to the known principles.

The main idea of the invention is to minimize the mean square error $E\{\sin^2 \alpha\}$, where $\alpha$ is the deflection angle of the received signal sample $\tilde{y}$ from the detected direction defined by the detected symbol $\hat{s}_k$, see FIG. 4. This goal can be approached in FIG. 2 by multiplying the projection voltage $z_k$ by the combined signal s in the multiplier 5 to form a product b and correlating each branch signal $s_m$ with the said multiplication product b in correlators $Cor_1 \ldots Cor_{M-1}(Cor_M)$. The multiplier 5 could be a wide-band balanced modulator as the signal $z_k$ is of low-pass type where the transitions may occur in multiples of the symbol interval T and the combined signal s is a bandpass signal at intermediate frequency. (The same principle can, however, be implemented by other mechanizations, where the multiplication operation is fulfilled by other types of multipliers. The correlation results $c_i (i=1 \ldots M)$ can be obtained by the use of same type of multipliers as the multiplier 5 and averaging the result e.g. by means of a low-pass filter.

The correlation results $c_i$ are used to control the amplitude and phase shifters $AP_1 \ldots AP_M$ in such a way that the correlation results will be zero. One possible method to reach the said goal is to use the steepest descent or gradient method in controlling the amplitude and phase of the shifters. In such a control, voltages proportional to the amplitude and phase of correlation results $c_i$ are subtracted from the amplitude and phase control voltages of the shifters $AP_1 \ldots AP_M$. At the equilibrium the correlation results are zero and the control signals of the shifters are no longer changed.

The receiver principle given in FIG. 2 can be modified to include only $M-1$ amplitude and phase shifters. One branch can be left without such a shifter. This is due to the fact that the carrier regenerator 4 adapts the regenerated carrier phase to the phase of the combined signal. The missing amplitude carrier can be achieved by the use of automatic gain control (AGC), which in such a case should be common to all the branches.

Figure 5:
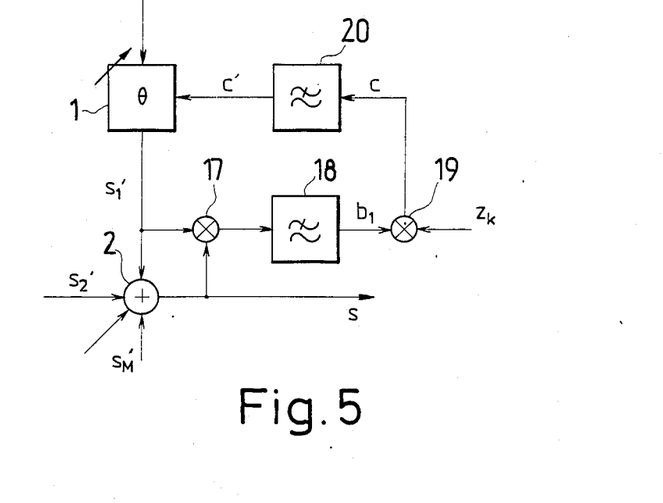
FIGS. 5 to 7 are block diagrams of alternative systems.
Figure 6:
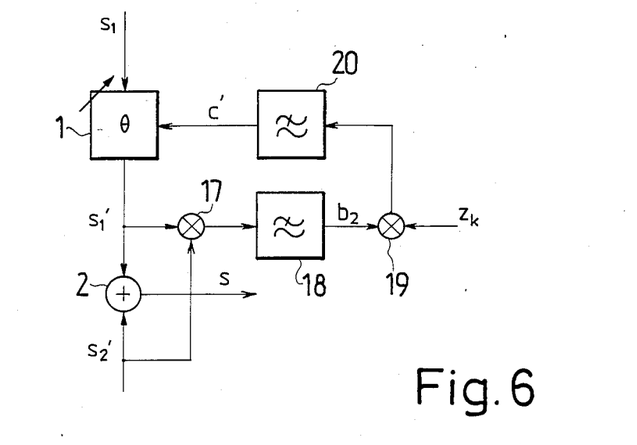
Figure 7:
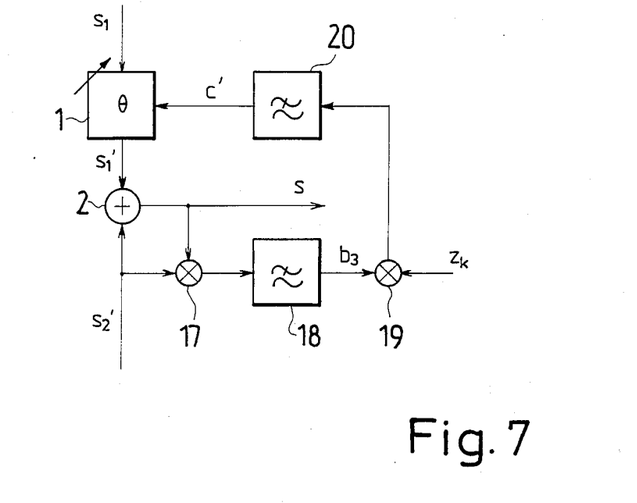

The realization principle of the invention can be modified in such a way that only phase shifters are used instead of the amplitude and phase shifters $AP_1 \ldots AP_M$. Furthermore, these phase shifters can be realized in several ways. First, the amplitude and phase shifters can be substituted by phase shifters. Secondly, the phase shifters may be connected to the outputs of the local oscillators which are used in mixing which generates the intermediate frequency signals. Thirdly, the said local oscillators may be voltage controlled oscillators (VCO), whose phase is controlled by the correlation voltages $c_m$. If the first method is used we have at least the realization principles in FIGS. 5 ... 7 available. Notice that in all these principles the other signal $s'_m$ in forming the product voltage b is taken after the phase shifter. In FIG. 5 a general M branch combining is given and the control of the phase shifter in one branch is shown. The intermediate frequency signal $s'_m$ and s are multiplied in multiplier 17, which may be of balanced modulator type. The multiplication result is low-pass filtered by the filter 18, where the double frequency terms are eliminated but the low-pass terms are passed without distortion. The low-pass result $b_1$ is then multiplied by the low-pass projection voltage $z_k$ in the multiplier 19. This DC-type multiplier can be realized, e.g. digitally as was earlier explained in the context of forming the voltage $z_k$. The multiplication result c is low-pass filtered in the filter 20 which may be a RC-low-pass filter, whose time constant is very large compared to the symbol length T. The averaged result c' is used to control the phase shifter 1. The phase shift $\theta$ is assumed to be proportional to the control voltage c'. At the equilibrium the voltage c will be zero and the phase shift $\theta$ will be proportional to the instantaneous value c' at the filter output. Due to the decaying output voltage of the low-pass filter when the input voltage c is zero, a minor change in $\theta$ will take place and proper nonzero correction signals in c will be provided to reach the equilibrium again.

The principles in FIG. 6 and FIG. 7 differ from the previous principle in FIG. 5 in forming the product voltage b. The special solutions used restrict the area of application of these principles to two branch combining. In FIG. 6 the signals $s'_1$ and $s'_2$ are multiplied to form after low-pass filtering in 18 the product voltage $b_2$. The control signal c' is then formed as in FIG. 5. In FIG. 7 the signal $s'_2$ and the combined signal s are multiplied and the rest of the receiver is as described before.

EXAMPLE 1

We give here a detailed description of the operation in one of the principles described in the general section. Consider a two branch diversity receiver in FIG. 8, where only a pure phase shifter 1 is used in the other branch. This is a special case of the principle given in FIG. 5. Assume that four phase modulation (4PSK or QPSK) is used and that the channel is ideal and nondispersive. White Gaussian noise is present at both branches and these noises are uncorrelated. We adopt the complex envelope notation, 7, pp 565 ... /, for conciseness.

Figure 8:
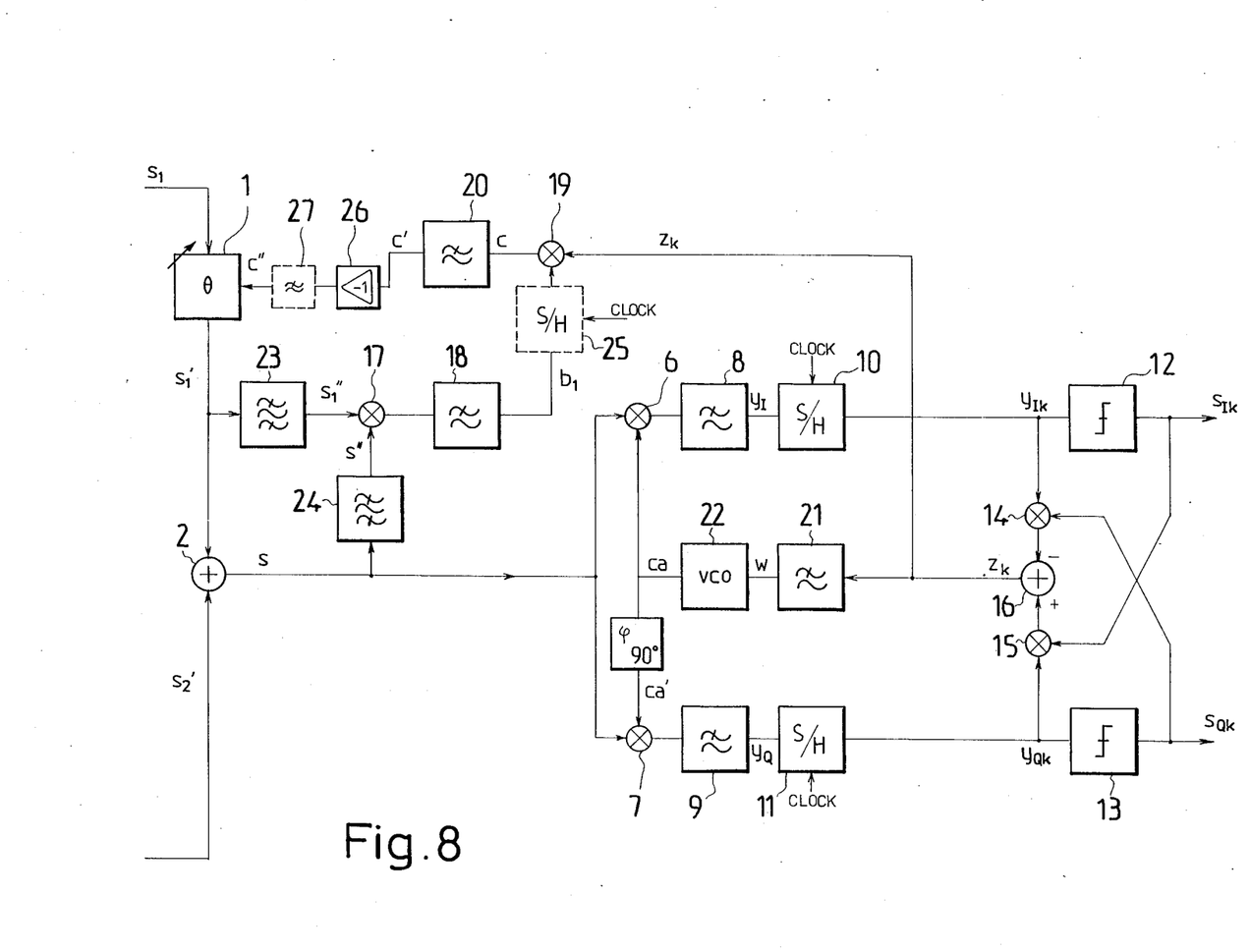
FIGS. 8 and 9 are block diagrams of two different system embodiments for carrying out the method according to the invention.

The input signal and noise for the diversity branch 1 are now $$s_1(t) = Re\{(\tilde{s}_k f(t)e^{j\theta_1} + \tilde{n}_1(t))e^{j\omega_0 t}\} \qquad (4)$$

where only the $k^{th}$ time interval is considered. The transmitted pulse waveform is f(t), the noise is $\tilde{n}_1(t)$, $\theta_1$ is the phase difference between the two branches caused by the transmission channel, $\omega_0$ is the intermediate angle frequency, and the modulation is included into $\tilde{s}_k$ which is of the form $$\tilde{s}_k = s_{Ik} + js_{Qk} \qquad (5)$$

where $s_{Ik}$ and $s_{Qk}$ may have values $+1/\sqrt{2}$ and $-1/\sqrt{2}$ (for 4 PSQ)

At the combiner 2 the signals $s'_1$ and $s'_2$ are summed and these are $$s'_1 = Re\{(\tilde{s}_k f(t)e^{j\theta + j\theta_1} + \tilde{n}_1(t)e^{j\theta})e^{j\omega_0 t}\} \quad (6)$$

$$s'_2 = Re\{(\tilde{s}_k f(t) + \tilde{n}_2(t))e^{j\omega_0 t}\} \quad (7)$$

The combined signal s is $$s = s'_1 + s'_2 \quad (8)$$

The angle $\theta$ is phase shift caused by the phase shifter 1 to the signal $s_1$.

The reference carrier signals used to perform the coherent detection are of the form $$ca = Re\{e^{j\omega_0 t + j\rho}\} \quad (9)$$

and $$ca' = Re\{je^{j\omega_0 t + j\rho}\} \quad (10)$$

where the angle $\rho$ is the phase of the reference carrier signal from the VCO.

Let us consider the in-phase branch of the detector. The summed signal s comes to the multiplier (e.g., a balanced modulator) 6 where it is multiplied by the reference carrier signal given in Eq. (9). The low-pass filter 8 eliminates the double frequency term, which occurs after the multiplier 6 and only the low-pass type term of the multiplication result gets through to the input of the sample and hold circuit 10. The impulse response of the low-pass filter 8 is h(t) and hence the output pulse form is the convolution of the input pulse form f(t) and the said impulse response h(t). This convolution result is denoted g(t). Hence the input signal to the sample and hold circuit 10 is given by $$y_I(t) = Re\{K(\tilde{s}_k(1 + e^{j\theta + j\theta_1})g(t) + \tilde{N}_1(t)e^{j\theta} + \tilde{N}_2(t))e^{-j\rho}\} \quad (11)$$

where K includes the effect of the multiplier coefficient and $\tilde{N}_1 e^j$ and $\tilde{N}_2$ are the low-pass filtered noises from branches 1 and 2.

The continuous waveform signal $y_I(t)$ is fed to the sample and hold circuit 10 and the analog sample is taken at time T (actually at time $(k+1)T$ for the present single pulse analysis. The output $y_{Ik}$ is held constant for time T until the next sample from the succeeding pulse is taken. The sample $y_{1k}$ to the decision circuit 12 is given by $$y_{Ik} = Re\{K(\tilde{s}_k(1 + e^{j\theta + j\theta_1})g(T) + \tilde{N}_1(T)e^{j\theta} + \tilde{N}_2(T))e^{-j\rho}\} \quad (12)$$

Similarly the sample $y_{Qk}$ is calculated to be $$y_{Qk} = Im\{K(\tilde{s}_k(1 + e^{j\theta + j\theta_1})g(T) + \tilde{N}_1 e^{j\theta} + \tilde{N}_2)e^{-j\rho}\} \quad (13)$$

We can now calculate the projection variable $z_k$ after the summing device 16 according to the definition in Eqs. (2) and (3). For the sake of brevity we use complex definition in Eq. (1) for $\tilde{y}$. We get $$z_k = Im\{K\tilde{s}_k^*(\tilde{s}_k(1 + e^{j\theta + j\theta_1})g(T) + \tilde{N}_1 e^{j\theta} + \tilde{N}_2)e^{-j\rho}\} \quad (14)$$

where the complex conjugate $s_k^*$ is given by $$\tilde{s}_k^* = s_{Ik} - js_{Qk} \quad (15)$$

where $s_{Ik}$ and $s_{Qk}$ are the detected symbols at the output of threshold devices 12 and 13. The output $s_{Ik}$ is $+1/\sqrt{2}$ if the input voltage $y_{Ik}$ is positive and $-1/\sqrt{2}$ if it is negative.

Next we shall consider the control voltage w at the input of the reference carrier VCO 22. The low-pass filter 21 is e.g. a RC-filter, whose time constant is large compared to the symbol length T. Thus the output w of this filter is effectively the average value of the input $z_k$. We obtain $$E\{z_k\} = Im\{K(E(\hat{s}_k^* \tilde{s}_k)(1 + e^{j\theta + j\theta_1})g(T) + E(\hat{s}_k^* \tilde{N}_1 e^{j\theta}) + E(\hat{s}_k^* \tilde{N}_2))e^{-j\rho}\} \quad (16)$$

where E( ) denotes the statistical expectation (average).

Assuming high signal-to-noise ratio, the receiver will most of the time make correct decisions and hence $\hat{s}_k$ and $\tilde{s}_k$ are the same. We get $$E\{\hat{s}_k^* \tilde{s}_k\} = 1 \quad (17)$$

Furthermore, the noises and the transmitted symbols are uncorrelated and their average values are zero. Thus the noise terms in Eq. (16) are averaged to zero. We get $$w = E\{z_k\} = Kg(T)\{\sin(\theta_1 + \theta - \rho) - \sin(\rho)\} \quad (18)$$

When this control voltage w is fed to the controlled oscillator (VCO)22, the phase $\rho$ is changed until the equlibrium is obtained, where voltage w is zero. This is the known phase locked loop principle. At the equilibrium state we have (putting in Eq. (18) w=0)

$$\rho = \tfrac{1}{2}(\theta + \theta_1) \quad (19)$$

Now, the projection variable $z_k$ in Eq. (14) can be evaluated further. Substituting the value of $\rho$ in Eq. (19) into Eq. (14) we have $$z_k = Im\{K \hat{s}_k^*(\tilde{N}_1 \exp(j\tfrac{1}{2}(\theta - \theta_1)) + \tilde{N}_2 \exp(-j\tfrac{1}{2}(\theta + \theta_1)))\} \quad (20)$$

In forming the control voltage c' of the phase shifter 1 we start with signals $s'_1$ and s and feed them into bandpass filters 23 and 24. These filters are equal and they should be in such a way chosen that their equivalent low-pass bandwidth is the same as in filters 8 and 9. If not so, at least the delay in these bandpass filters 23 and 24 should be the same as is caused by the detection process, i.e. T. The best result is obtained if the impulse response $h_b(t)$ of the bandpass filters is selected to be $$h_b(t) = Re\{h(t)e^{j\omega_0 t}\} \quad (21)$$

where h(t) is the impulse response of the low-pass filters 8 and 9.

Now the bandpass filtered signals into the multiplier 17 (which could be e.g. a wide band balanced modulator) are $$s_1'' = Re\{K_2(\tilde{s}_k g(t)e^{j\theta + \theta_1} + \tilde{N}_1 e^{j\theta})e^{j\omega_0 t}\} \quad (22)$$

$$s'' = s_1'' + Re\{K_2(\tilde{s}_k g(t) + \tilde{N}_2)e^{j\omega_0 t}\} \quad (23)$$

where $K_2$ is a coefficient of proportionality, whose exact value is of no importance.

The signals $s''_1$ and $s''$ are multiplied and the result is low-pass filtered in the low-pass filter 18, whose function is to eliminate the double frequency terms. Hence the bandwidth of the filter 18 should be chosen to be between the symbol rate 1/T and the intermediate frequency $f_o$. The multiplication result $b_1$ after the filter 18 is a low-pass type signal-with transitions occurring at most at rate $1/T$ and it is of the form $$b_1(t) = \frac{1}{2}K_2^2 Re\{g^2(1+e^{j\theta+j\theta_1}) + 2Re\{\tilde{s}_k g e^{j\theta_1} N_1^*\} + |\tilde{N}_1|^2 + \tilde{N}_1\tilde{N}_2^* e^{j\theta} + \tilde{s}_k g \tilde{N}_2^* e^{j\theta+j\theta_1} + \tilde{N}_1\tilde{s}_k g e^{j\theta}\} \quad (24)$$

where $g(t)$ is the filtered pulse form or convolution of the transmitted pulse form $f(t)$ and the filter impulse response $h(t)$.

The voltage $b_1(t)$ may be sampled at time $T$ to obtain the best result, but the sample and hold circuit 25 may also be omitted. During each time interval the voltages $b_1(T)$ and $z_k$ are multiplied in the multiplier 19, which should be capable to process low-pass type signals (e.g., a digital multiplier solution is possible). The multiplication result $c$ is low-pass filtered in 20, which ca be an RC-type filter with a large time constant compared to the symbol length $T$. This means that effectively the output voltage $c'$ of the filter 20 is an averaged version of the multiplication result $c$. The control voltage $c'$ is now calculated $$c' = -E\{z_k b_1(T)\} \quad (25)$$

where $b_1$ is given by Eq. (24) and $z_k$ by Eq. (20). Assuming again that signal-to-noise ratio is high (and hence $\tilde{s}_k + \hat{s}_k$) and recalling the uncorrelatedness of noises $\tilde{N}_1$ and $\tilde{N}_2$ as well as of the signal $\tilde{s}_k$, we obtain $$c' = \frac{1}{2}KK_2^2 g(T)(\sigma_1^2 + \sigma_2^2)\sin\frac{1}{2}(\theta + \theta_1) \quad (26)$$

where the variances $\sigma_1^2$ and $\sigma_2^2$ have been defined as $$E\{|N_i|^2\} = 2\sigma_i^2 \quad i = 1,2 \quad (27)$$

Obviously the control signal $c'$ is zero when $\theta = -\theta_1$ which means that the information bearing parts of the signals $s'_1$ and $s'_2$ are cophased (see Eqs. (6) and (7)). Furthermore, if the phase shift $\theta$ is near the equilibrium value and it has a minor difference $\delta\theta$ from the value $-\theta_1$ i.e.

$$\theta = -\theta_1 + \delta\theta \quad (28)$$

we see that the control voltage $c'$ gets a small positive value. The control voltage $c''$ of the phase shifter 1 is obtained by feeding the voltage $c'$ through an inverter 26 (e.g., a voltage follower) and a low-pass filter 27 with a large time constant compared to the symbol length $T$. (One should understand that the low-pass filter 27 is optional whose function may be included into the filter 20.) The minor positive change in $c'$ will now cause a minor negative change in the control voltage $c''$ of the phase shifter and hence the phase shift $\theta$ will be diminished until the equilibrium is achieved again. Thus the equilibrium value $\theta = -\theta_1$ is a stable point and leads to the wanted result where the information parts of the diversity signals will be cophased.

The analysis above concerns one special case in a nondispersive noisy channel. It was shown that applying the invention, the information parts of the diversity signals will be co-phased, which is the desired result. However, the greatest benefit of the invention is obtained when used in dispersive, multipath channels. The analysis of the receiver in such a case is utterly complex and is not presented here.

EXAMPLE 2

Figure 9:
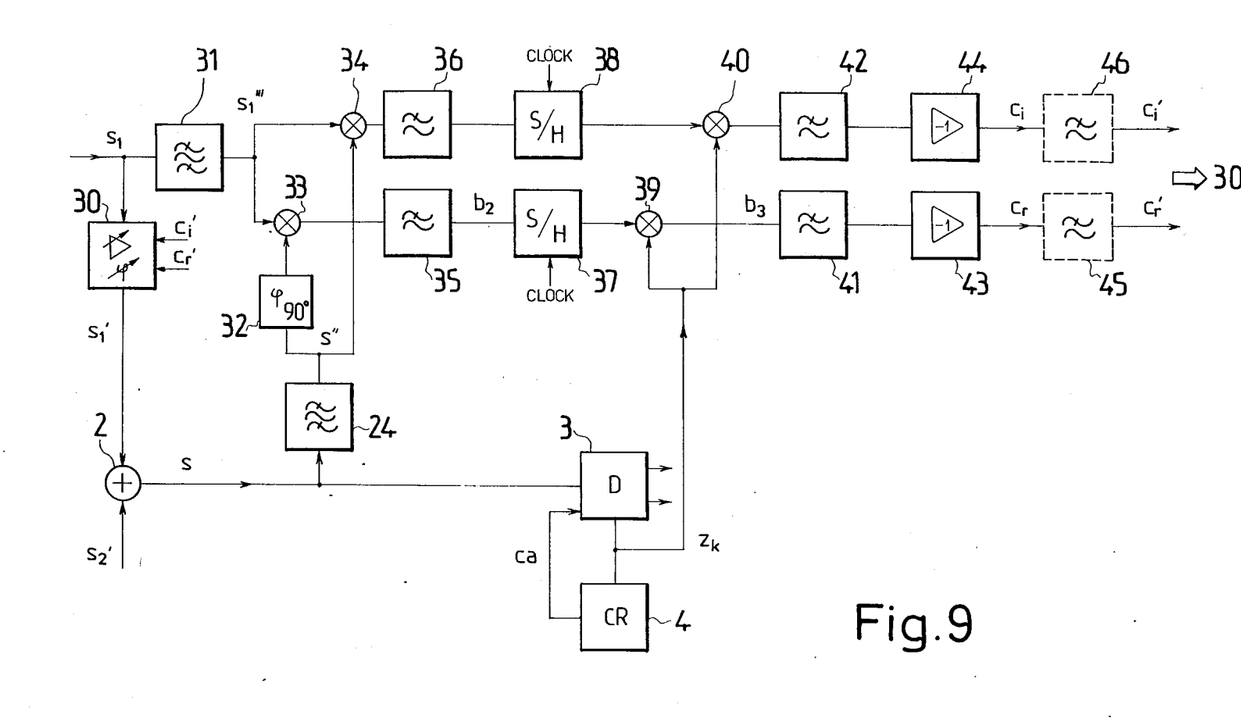

Consider two branch diversity receiver given in FIG. 9. This is a special case of the general principle in FIG. 2 where only one amplitude and phase shifter AV is used. Assume that four phase modulation is used as in the previous example. The detector 3 is similar to the detector in FIG. 3 and in the previous example.

The input signal and noise is the same as before and is given by Eq. (4). The amplitude and phase shifter 30 which can be of two-mixer type, causes voltage amplification $a$ and phase shift $\theta$. Hence the signal $s'_1$ to the summer 2 is $$s_1'(t) = Re\{(\tilde{s}_k f(t)ae^{j\theta+j\theta_1} + \tilde{n}_1 ae^{j\theta})e^{j\omega_0 t}\} \quad (29)$$

Proceeding similar as in the previous example we get the projection variable $z_k$ $$z_k = Im\{K\tilde{s}_k^*(\tilde{s}_k(1+ae^{j\theta+j\theta_1})g(T) + \tilde{N}_1 ae^{j\theta}) + \tilde{N}_2)e^{-j\omega_0 t}\} \quad (30)$$

Similarly as before we get the expected value $$w = E\{z_k\} = Kg(T)Im\{(1+ae^{j(\theta+\theta_1)})e^{-j\rho}\} \quad (31)$$

At the equilibrium, when the reference carrier phase changes no more, the control voltage $w$ into the VCO22 must be zero or $$\rho = \arg(1 + ae^{j(\theta+\theta_1)}) \quad (32)$$

Assuming that most of the decisions are correct and using Eq. (32) in Eq. (30), we have equilibrium $$z_k = Im\{K\tilde{s}_k^*(ae^{j\theta}\tilde{N}_1 + \tilde{N}_2)\} \quad (33)$$

where the notations are as earlier.

In forming the control voltages $c'_r$ and $c'_i$ for the amplitude and phase shifter 30 we start with signals $s_1$ and the combined signal $s$ and feed them through bandpass filters 31 and 24. The best operation is again achieved if the low-pass equivalent impulse responses of the bandpass filters are the same as the impulse responses of the low-pass filters 8 and 9.

Now the bandpass filtered combined signal after the filter 24 is $$s''(t) = Re\{K_2(\tilde{s}_k g(t)(1+ae^{j\theta+j\theta_1}) + ae^{j\theta}\tilde{N}_1 + \tilde{N}_2)e^{j\omega_0 t}\} \quad (34)$$

and the filtered signal after 31 is $$s'''(t) = RE\{K_2(\tilde{s}_k g(t)e^{j\theta_1} + \tilde{N}_1)e^{j\omega_0 t}\} \quad (35)$$

The signal $s''$ is fed through a 90° phase shifter 32 and then multiplied by the signal $s'''_1$ in the multiplier 33 (e.g. a wideband modulator). The result is low-pass filtered in 35 which is a relatively wideband filter whose purpose is to eliminate the double frequency terms generated in the multiplication. After the filter 35 the signal voltage is $$b_2 = \frac{1}{2}K_2^2 Re\{g^2(1+ae^{j\theta+j\theta_1})e^{-j\theta_1} + a\tilde{N}_1\tilde{s}_k^* ge^{j\theta-j\theta_1} + \tilde{N}_2\tilde{s}_k^* ge^{-j\theta_1} + \tilde{N}_1^* g\tilde{s}_k(1+ae^{j\theta+j\theta_1}) + a|\tilde{N}_1|^2 e^{j\theta} + \tilde{N}_1^*\tilde{N}_2\} \quad (36)$$

The result $b_2$ is sampled in the sample and hold ciruit 37, which is optional and may be omitted, and then multiplied by the projection variable $z_k$ (given by Eq.

(33)) in the multiplier 39. Both input signals to this multiplier are of low-pass type and hence this multiplier should be low-pass type. It can be realized, e.g., digitally and even one or both inputs may be quantized to have only values $+U$ and $-U$, where U is any proper voltage depending on the components selected.

The output $b_3$ of the multiplier 39 is fed into a narrow band low-pass filter 41, which effectively averages the products $b_3$. Assuming high signal-to-noise ratio, most decisions $s_{Ik}$ and $s_{Qk}(s_k)$ will be correct and we obtain similarly as earlier the voltage $c_r$ after the amplifier 43 (which is an amplifier with negative voltage gain, an inverter)

$$c_r = E\{-z_k b_2(T)\} \quad (37)$$

and substituting Eq. (33) and Eq. (36) into Eq. (37), we obtain $$c_r = \frac{2\delta_1{}^2}{4} KK_2{}^2 g(T)Re\left\{e^{jp-j\theta_1}\left(a^2 + \left(\frac{\sigma_2}{\sigma_1}\right)^2\right) - e^{-jp+j\theta}a(1 + ae^{j\theta+j\theta_1})\right\} \quad (38)$$

$$= Re\{c_1\}$$

where $c_1$ is a complex variable. Similarly through the upperpath 34, 36, 38, 40, 42, 44 we get $$c_i = Im\{c_1\} \quad (39)$$

At the equilibrium, both $c_r$ and $c_i$ must be zero. This means that the terms in the subtraction in Eq. (38) must be equal and in the same phase. Taking Eq. (32) into account, we have $$c_r = K_4 Re\left\{e^{jp-j\theta_1}\left(a^2 + \left(\frac{\sigma_2}{\sigma_1}\right)^2\right) - |1 + ae^{j\theta+j\theta_1}|ae^{j\theta}\right\} \quad (40)$$

where $K_4$ includes the constants. Because the terms must be in the same phase, we get $$p = \theta + \theta_1 \quad (41)$$

In connection with Eq. (32) this leads to $$\theta = -\theta_1 \quad (42)$$

Substitution of Eqs. (41) and (42) into Eq. (40) leads to the value for a as $$a = \left(\frac{\sigma_2}{\sigma_1}\right)^2 \quad (43)$$

The result is the well-known maximal ratio combining rule, which is known to be optimum for nondispersive channels. The invention is a new method to implement this rule in digital transmission.

The voltages $c_r$ and $c_i$ are fed to narrow band low-pass filters (e.g. RC-type) 45 and 46 whose outputs $c'_r$ and $c'_i$ are averaged or integrated results of the correction voltages $c_r$ and $c_i$. The amplitude and phase shifter 30 is assumed to have such control characteristics that giving inputs $a^* \cos \theta$ and $a^* \sin \theta$ lead to amplification a and phase shift $\theta$ (these shifters are, e.g., commercially available two-mixer type devices). Now, output voltage $c'_r$ is fed to the input of 30 which expects $a^* \cos \theta$ and $c'_i$ is fed to the input expecting $a^* \sin \theta$. Alternatively, the filters 45 and 46 may be omitted and their effect may be included into the low-pass filters 41 and 42.

We can easily check that the result for a and $\theta$ is a stable equilibrium point. Giving minor changes in a and $\theta$ we find that voltages which make corrections to the opposite direction are generated. This implies that the connections of $c'_r$ and $c'_i$ are made as explained.

I claim:

1. A method for the reception and the detection of digital signals, comprising the steps of:
    receiving at least two signals ($s_1, s_2, \ldots, s_M$) having at least approximately the same information content, by means of at least one antenna or equivalent;
    subjecting at least all received signals ($s_1, s_2, \ldots, s_M$) but one to a phase shift or to an amplitude shift and a phase shift;
    combining the shifted signals ($s'_1, s'_2, \ldots, s'_M$) at a summing point to obtain a sum signal (s);
    feeding the sum signal (s) to a detector for detection;
    generating in a reference carrier generator a reference carrier;
    carrying out a coherent demodulation and detection in the detector by means of said carrier;
    generating a projection voltage ($z_k$) defined by the following equation $$z_k = y_{Qk}s_{Ik} - Y_{Ik}s_{Qk};$$

wherein
    $y_{Ik}$ is a signal sample in an in-phase branch before threshold decision in the detector,
    $y_{Qk}$ is a signal sample in a quadrature branch before decision in the detector,
    $s_{Ik}$ is the detected signal in said in-phase branch, and
    $s_{Qk}$ is the detected signal in said quadrature branch;
    generating a product signal (b) by multiplying said sum signal (s) with said projection voltage ($z_k$);
    generating control voltages ($c_1, \ldots, c_M$) by correlating said product signal (b) with the received signals of each branch under consideration; and
    controlling at least the phase shifts by means of said control voltages ($c_1, \ldots, c_M$) in increments proportional to said control voltages until said control voltages reach a zero value.

2. A method as claimed in claim 1, in which only a phase shift is carried out, wherein said phase shift is carried out by means of conventional phase shifters.

3. A method as claimed in claim 1 in which only a phase shift is carried out, wherein said phase shift is carried out by controlling oscillator phases.

4. A method claimed in claim 1, in which both a phase shift and an amplitude shift are carried out, wherein the unshifted received signals ($s_1, \ldots, s_M$) are used as incoming signals to be correlated with said product signal.

5. A method as claimed in claim 1, in which only a phase shift is carried out, wherein said phase shifted signals ($s'_1, \ldots, s'_M$) are used as incoming signals to be correlated with said product signal.

6. A method as claimed in claim 1, wherein angle modulaton, e.g., 2-, 4-, . . . , n-phase modulation is used as a modulation method.

7. A method as claimed in claim 1, wherein combined angle and amplitude modulation, e.g., the QAM method is used as a modulation method.

8. A method as claimed in claim 1, wherein all signals but one ($s_1, s_2, \ldots, s_{M-1}$) are subjected to the phase shift or the phase and amplitude shift.

9. A method as claimed in claim 1, wherein the carrier is remodulated by said detected signals ($s_{Ik}, s_{Qk}$).

10. A method as claimed in claim 9, wherein said remodulated carrier is fed to a correlator related to a corresponding phase shifter.

11. A method for the reception and the detection of digital signals, comprising the steps of:
   receiving two signals having at least approximately the same information content, by means of at least one antenna or equivalent;
   subjecting a first of said two signals to a phase shift;
   summing said phase-shifted first signal and a second of said two signals at a summing point to produce a sum signal;
   feeding the sum signal to a detector for detection;
   generating a reference carrier;
   carrying out a coherent demodulation and detection in the detector by means of said carrier (ca);
   generating a projection voltage ($z_k$) defined by the following equation $$z_k = y_{Qk}s_{Ik} - y_{Ik}s_{Qk},$$

wherein
   $y_{Ik}$ is a signal sample in an in-phase branch before threshold decision in the detector,
   $y_{Qk}$ is the signal sample in a quadrature branch before detection,
   $s_{Ik}$ is the detected signal in the in-phase branch, and
   $s_{Qk}$ is the detected signal in the quadrature branch;
   generating a first product signal by multiplying said second signal with the shifted signal;
   generating a second product signal by multiplying the first product signal with the projection voltage ($z_k$);
   averaging the second product signal by forming a floating average; and
   controlling the phase shift by means of the averaged signal in increments proportional to said averaged signal until said averaged signal reaches zero.

12. A method as claimed in claim 11, in which the sum signal is used as the shifted signal.

13. A method as claimed in claim 11, in which the phase shift is carried out by means of a conventional phase shifter.

14. A method as claimed in claim 11, in which the phase shift is carried out by means of oscillators.

15. A method as claimed in claim 12, in which the phase shift is carried out by means of a conventional phase shifter.

16. A method as claimed in claim 12, in which the phase shift is carried out by means of oscillators.

* * * * *